United States Patent
Kachare et al.

(10) Patent No.: US 11,902,422 B2
(45) Date of Patent: *Feb. 13, 2024

(54) SYSTEMS, METHODS, AND DEVICES FOR KEY PER INPUT/OUTPUT SECURITY

(71) Applicant: Samsung Electronics Co., Ltd., Suwon-si (KR)

(72) Inventors: Ramdas P. Kachare, Pleasanton, CA (US); Xuebin Yao, San Diego, CA (US); Jimmy K. Lau, Santa Clara, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,110

(22) Filed: Dec. 28, 2022

(65) Prior Publication Data

US 2023/0137282 A1  May 4, 2023

Related U.S. Application Data

(63) Continuation of application No. 17/157,560, filed on Jan. 25, 2021, now Pat. No. 11,575,505.

(Continued)

(51) Int. Cl.
*H04L 9/08* (2006.01)
*G06F 13/16* (2006.01)
(Continued)

(52) U.S. Cl.
CPC ........ *H04L 9/0816* (2013.01); *G06F 13/1668* (2013.01); *G06F 21/79* (2013.01)

(58) Field of Classification Search
CPC ..... H04L 9/0816; H04L 9/0894; G06F 21/79; G06F 21/78; G06F 21/62; G06F 12/1408;
(Continued)

(56) References Cited

U.S. PATENT DOCUMENTS 8,165,301 B1   4/2012  Bruce et al.
10,157,153 B2  12/2018 Shacham et al.
(Continued)

OTHER PUBLICATIONS

Complexity of the lookup-table minimization problem for FPGA technology mapping, by Farrahi et al. published 1994 (Year: 1994).*

*Primary Examiner* — Vu V Tran
(74) *Attorney, Agent, or Firm* — Lewis Roca Rothgerber Christie LLP

(57) ABSTRACT

A device includes a communications circuit configured to communicate with a storage device controller and a host device. The device further includes a processing device configured to receive a request from the storage device controller through the communications circuit. The request requests encrypted data be written to a memory address of the host device. The processing device is further configured to identify a key associated with the write request based on the memory address. The processing device is further configured to generate a decrypted version of the data based on the key. The processing device is further configured to initiate transfer, through the communications circuit, of the decrypted version of the data to the host device.

20 Claims, 10 Drawing Sheets

Related U.S. Application Data

(60) Provisional application No. 63/057,283, filed on Jul. 27, 2020.

(51) Int. Cl.
*G06F 21/60* (2013.01)
*G06F 21/62* (2013.01)
*G06F 21/78* (2013.01)
*G06F 12/14* (2006.01)
*G06F 13/12* (2006.01)
*G06F 21/79* (2013.01)

(58) Field of Classification Search
CPC . G06F 13/124; G06F 13/1642; G06F 13/1668
See application file for complete search history.

(56) References Cited

U.S. PATENT DOCUMENTS

| | | | |
|---|---|---|---|
| 2012/0284527 A1* | 11/2012 | Nagpal | G06F 3/0659 |
| | | | 711/E12.091 |
| 2017/0220494 A1 | 8/2017 | Shacham et al. | |
| 2018/0267906 A1* | 9/2018 | Shirai | G06F 12/0238 |
| 2019/0147192 A1 | 5/2019 | Khosravi et al. | |
| 2019/0155754 A1 | 5/2019 | Kida et al. | |
| 2019/0361605 A1* | 11/2019 | Kanno | H04L 9/0894 |
| 2020/0089430 A1* | 3/2020 | Kanno | G06F 3/0679 |
| 2020/0167487 A1* | 5/2020 | Kida | G06F 21/606 |
| 2020/0210597 A1 | 7/2020 | Bates et al. | |
| 2021/0218562 A1* | 7/2021 | Grobelny | G06F 21/52 |
| 2021/0336772 A1* | 10/2021 | Debata | H04L 9/0894 |

\* cited by examiner

SYSTEMS, METHODS, AND DEVICES FOR KEY PER INPUT/OUTPUT SECURITY

CROSS REFERENCE TO RELATED APPLICATION

This application is a continuation of U.S. patent application Ser. No. 17/157,560, filed on Jan. 25, 2021, which claims priority to and the benefit of U.S. Provisional Patent Application No. 63/057,283, filed Jul. 27, 2020, the contents of which are hereby incorporated by reference in their entirety.

BACKGROUND

Many companies and individuals store sensitive data on computer storage systems. Accordingly, information security data stored in storage systems has become very important in recent years. Examples of situations in which data may be at risk include loss or theft of a storage device, sharing of a storage device between multiple users, etc.

SUMMARY

Systems and methods of providing key per input/output (I/O) in a storage system are disclosed. In particular, the disclosed systems and methods may provide key per I/O without modification to a storage device controller.

A device includes a communications circuit configured to communicate with a storage device controller and a host device. The device further includes a processing device configured to receive a request from the storage device controller through the communications circuit. The request requests encrypted data be written to a memory address of the host device. The processing device is further configured to identify a key associated with the write request based on the memory address. The processing device is further configured to generate a decrypted version of the data based on the key. The processing device is further configured to initiate transfer, through the communications circuit, of the decrypted version of the data to the host device.

In some implementations, the processing device is further configured to receive a second request from the storage device controller through the communications circuit. The second request may request that third data be read from a second memory address of the host device. The processing device may further be configured to identify a second key tag associated with the second request based on the second memory address. The processing device may further be configured to store an association between the second key tag and a read tag of the second request. The processing device may further be configured to initiate transmission of the second request to the host device. The processing device may further be configured to receive a message from the host device. The message may include the read tag and the third data. The processing device may further be configured to identify the second key tag based on the association between the second key tag and the read tag. The processing device may further be configured to identify a second key based on the second key tag. The processing device may further be configured to encrypt the third data based on the second key.

A method includes receiving, at a device in communication with a storage device controller and a host device, a request from the storage device controller, the request requesting encrypted data be written to a memory address of the host device. The method further includes identifying a key associated with the write request based on the memory address. The method further includes generating a decrypted version of the data based on the key. The method further includes initiating transfer of the decrypted version of the data to the host device.

In some implementations the method further includes receiving a second request from the storage device controller. The second request may request third data be read from a second memory address of the host device. The method may further include identifying a second key tag associated with the second request based on the second memory address. The method may further include storing an association between the second key tag and a read tag of the second request. The method may further include initiating transmission of the second request to the host device. The method may further include receiving a message from the host device. The message may include the read tag and the third data. The method may further include identifying the second key tag based on the association between the second key tag and the read tag. The method may further include identifying a second key based on the second key tag. The method may further include encrypting the third data based on the second key.

A computer readable storage device stores instructions executable by one or more processors to receive, at a device in communication with a storage device controller and a host device, a request from the storage device controller, the request requesting encrypted data be written to a memory address of the host device. The instructions are further executable to identify a key associated with the write request based on the memory address. The instructions are further executable to generate a decrypted version of the data based on the key. The instructions are further executable to initiate transfer of the decrypted version of the data to the host device.

The instructions may be further executable by the one or more processors to receive a second request from the storage device controller. The second request may request that third data be read from a second memory address of the host device. The instructions may be further executable by the one or more processors to identify a second key tag associated with the second request based on the second memory address. The instructions may be further executable by the one or more processors to store an association between the second key tag and a read tag of the second request. The instructions may be further executable by the one or more processors to initiate transmission of the second request to the host device. The instructions may be further executable by the one or more processors to receive a message from the host device. The message may include the read tag and the third data. The instructions may be further executable by the one or more processors to identify the second key tag based on the association between the second key tag and the read tag. The instructions may be further executable by the one or more processors to identify a second key based on the second key tag. The instructions may be further executable by the one or more processors to encrypt the third data based on the second key.

DETAILED DESCRIPTION

Figure 1:
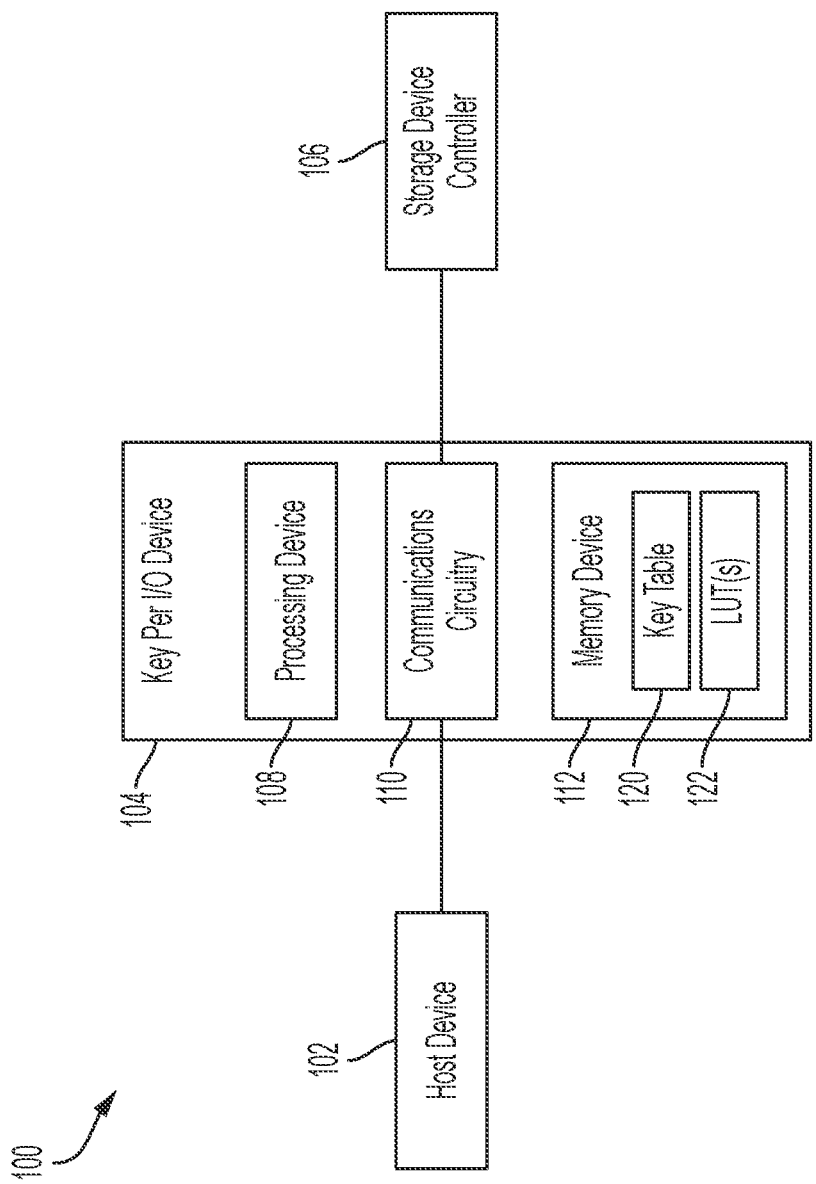
FIG. 1 is a diagram of a system for providing key per I/O security.

Referring to FIG. 1, a diagram of a system 100 for key per input/output (I/O) is shown. The system 100 includes a host device 102, a key per I/O device 104, and a storage device controller 106. The host device 102 may include a computing device. In some implementations the host device 102 corresponds to a non-volatile memory express (NVMe) host device. The storage device controller 106 is a computing device configured to manage one or more storage devices. In some implementations, the storage device controller 106 corresponds to a solid state drive (SSD) controller.

In the illustrated example, the key per I/O device 104 includes a processing device 108, a communications circuitry 110, and a memory device 112.

The memory device 112 may include dynamic random access memory (DRAM), static random access memory (SRAM), erasable programmable read-only memory (EPROM), electrically erasable programmable read-only memory (EEPROM), another type of memory, a solid state device, another type computer readable storage device or a combination thereof. As used herein, a computer readable storage device refers to an article of manufacture and not to a transient signal. It should be noted that in some implementations, the memory device 112 may be external to and accessible by the key per I/O device 104. Further, the memory device 112 corresponds to two or more different devices in some examples.

In some implementations, the key per I/O device 104 corresponds to a field programmable gate array (FPGA) device, as discussed further below with reference to FIG. 2. In such implementations, the processing device 108 may correspond to one or more FPGA components. In other implementations, the key per I/O device 104 corresponds to a computing device that includes a central processor unit (CPU), as described further below with reference to FIG. 3. In such implementations, the computing device may correspond to one or more CPUs configured to execute instructions stored in the memory device 112.

The communications circuitry 110 includes one or more communications interfaces. The communications circuitry 110 is configured to communicate (e.g., to send and receive data and commands) with the host device 102 and the storage device controller 106 through the one or more communications interfaces. In some implementations, the communications circuitry 110 includes a first communications interface configured to communicate with the host device 102 and a second communications interface configured to communicate with the storage device controller 106. In other implementations, the communications circuitry 110 includes a communications interface configured to communicate with both the host device 102 and the storage device controller 106. Further, while two devices (the host device 102 and the storage device controller 106) are shown in communication with the key per I/O device 104, it should be noted that in other implementations more than two devices may communicate with the key per I/O device 104 through the communications circuitry 110. For example, the key per I/O device 104 may communicate with more than one host device and/or more than one storage device controller through the communications circuitry 110. Examples of communications interfaces that may be included in the communications circuitry 110 include peripheral component interconnect express (PCIe) interfaces, network interface controllers (e.g., Ethernet interfaces), other types of communications interfaces, or a combination thereof.

The memory device 112 stores a key table 120 and one or more look up tables (LUTs) 122. The key table 120 stores associations of keys to key tag. For example, the key table 120 may store a row that includes a first key tag and a first key indicating that the first key tag is associated with the first key. While the illustrated example includes the key table 120, other implementations may include a different data structure associating keys with key tags. The key table 120 may be generated based on key to key tag mappings received from a key server, from the host device 102, or from another device (e.g., during a configuration operation). In some implementations, associations between keys and key tags are specific to host devices. For example, the key table 120 may include a row that includes a first key tag, a first key, and an identifier of the first host device 102 indicating that the first key tag is mapped to the first key for I/O associated with the first host device 102. In some implementations the key table 120 includes 64,000 entries.

In some examples, the key table 120 is populated by the storage device controller 106. Security firmware in the storage device controller 106 may use send/receive commands (e.g., NVMe Security send/receive commands) along with trusted computing group (TCG) protocols to securely download the keys. The unencrypted keys may then be provided to the key table 120 in the key per I/O device 104 the communications circuitry 110 (e.g., in-band and/or out of band connections such as a PCIe connection, a system management bus (SMBus) connection, or an Inter-Integrated Circuit (I2C) connection. In other examples, the key table 120 in the key per I/O device 104 is populated by host device 102 directly without involving the storage device controller 106.

The one or more LUTs 122 include a LUT associating an address ranges to key tags, a LUT associating read tags to key tags, or a combination thereof. It should be noted that in some implementations, the LUTs 122 may be replaced by one or more different data structures. Commands and data exchanged between the host device 102 and the storage device controller 106 are sent through the key per I/O device 104. The key per I/O device 104 is configured to snoop (e.g., monitor) commands from the host device 102 to update the LUTs 122 with address range to key tag mappings. The key per I/O device 104 is further configured to use the LUTs 122 to map addresses included in requests to key tags and to provide inline encryption/decryption based on the keys associated with the key tags. Accordingly, the key per I/O device 104 may provide key per I/O security in a system that includes a storage device controller that does not support key per I/O security.

Figure 2:
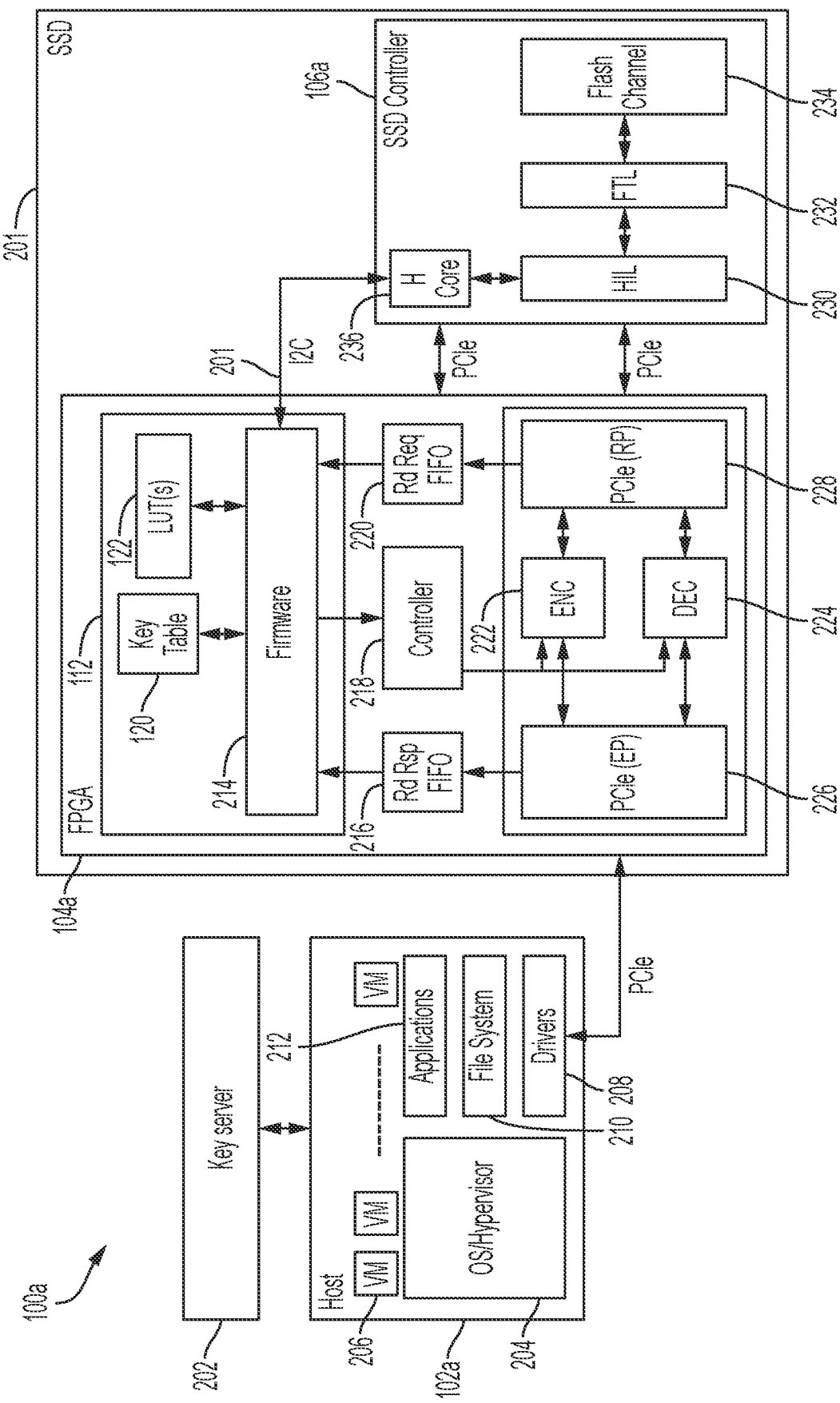
FIG. 2 is a diagram of a system in which a key per I/O device is implemented as a field programmable gate array device.

Referring to FIG. 2, a diagram of a system 100*a* in which the key per I/O device 104 of the system 100 corresponds to a FPGA 104*a* is shown. In the illustrated example of FIG. 2, the FPGA 104*a* and a SSD controller 106*a* (corresponding to the storage device controller 106) are included in a SSD device 201 and a host device 102*a* (corresponding to the host device 102) is connected to the SSD device 201 through the FPGA 104*a*. The host device 102*a* is further connected to a key server 202. The key server 202 is a computing device configured to generate keys to be used by the host device 102*a* for I/O commands. An operating system (OS) or hypervisor of the host device 102*a* may further generate key tags for the keys. In some implementations, the FPGA 104*a* receives the key table 120 from the key server 202.

The host device 102*a* includes an operating system/hypervisor 204 configured to manage virtual machines 206, a file system 210, and applications 212. The host device 102*a* further includes drivers 208. Each of these components of the host device 102*a* corresponds to software executable by one or more processors (not shown) of the host device 102*a*. The drivers 208 are configured to facilitate communication between the operating system/hypervisor 204 and hardware (not shown) of the host device 102*a*. Such hardware may include a communications interface (e.g., a PCIe port).

The FPGA 104*a* includes a read response buffer 216, a controller 218, a read request buffer 220, an encoder 222, and a decoder 224. The read response buffer 216, the controller 218, the read request buffer 220, the encoder 222, and the decoder 224 correspond to the processing device 108 and include FPGA blocks. The memory device 112 further stores firmware 214 executable by the controller 218. The controller 218 can be implemented as hardware, firmware, or a combination of both. The LUTs 122 are accessible to the firmware 214 (e.g., connected to the controller 218 or included in the firmware 214).

The FPGA 104*a* includes a first PCIe adapter 226 (e.g., a first communications adapter), a second PCIe adapter 228 (e.g., a second communications adapter), and an I2C adapter 201. The PCIe adapters 226, 228 and the I2C adapter 201 correspond to the communications circuitry 110. The FPGA 104*a* is configured to communicate with the host device 102*a* through the first PCIe adapter 226 and with the SSD controller 106*a* through the second PCIe adapter 228. In the illustrated example, the first PCIe adapter 226 corresponds to a PCIe endpoint port (EP) and the second PCIe adapter 228 corresponds to a PCIe root port (RP). The I2C adapter 201 may be configured to receive a status of certain registers (e.g., NVMe registers) included in the SSD controller 106*a*.

In operation, the FPGA 104*a* is configured to forward data and I/O commands between the host device 102*a* and the SSD controller 106*a* and provide key per I/O encryption/decryption, as described further herein.

The SSD controller 106*a* includes a host interface CPU core (H core) 236, and implements a host interface layer 230, a flash translation layer 232, and a flash channel 234. The host interface layer 230 corresponds to software configured to process commands received from the host device 102. The flash translation layer 232 corresponds to software configured to map logical block addresses to physical addresses of one or more flash storage devices (not shown) connected to the SSD controller 106*a*. The flash channel 234 corresponds to an interface between the SSD controller 106*a* and one or more solid state devices.

Figure 3:
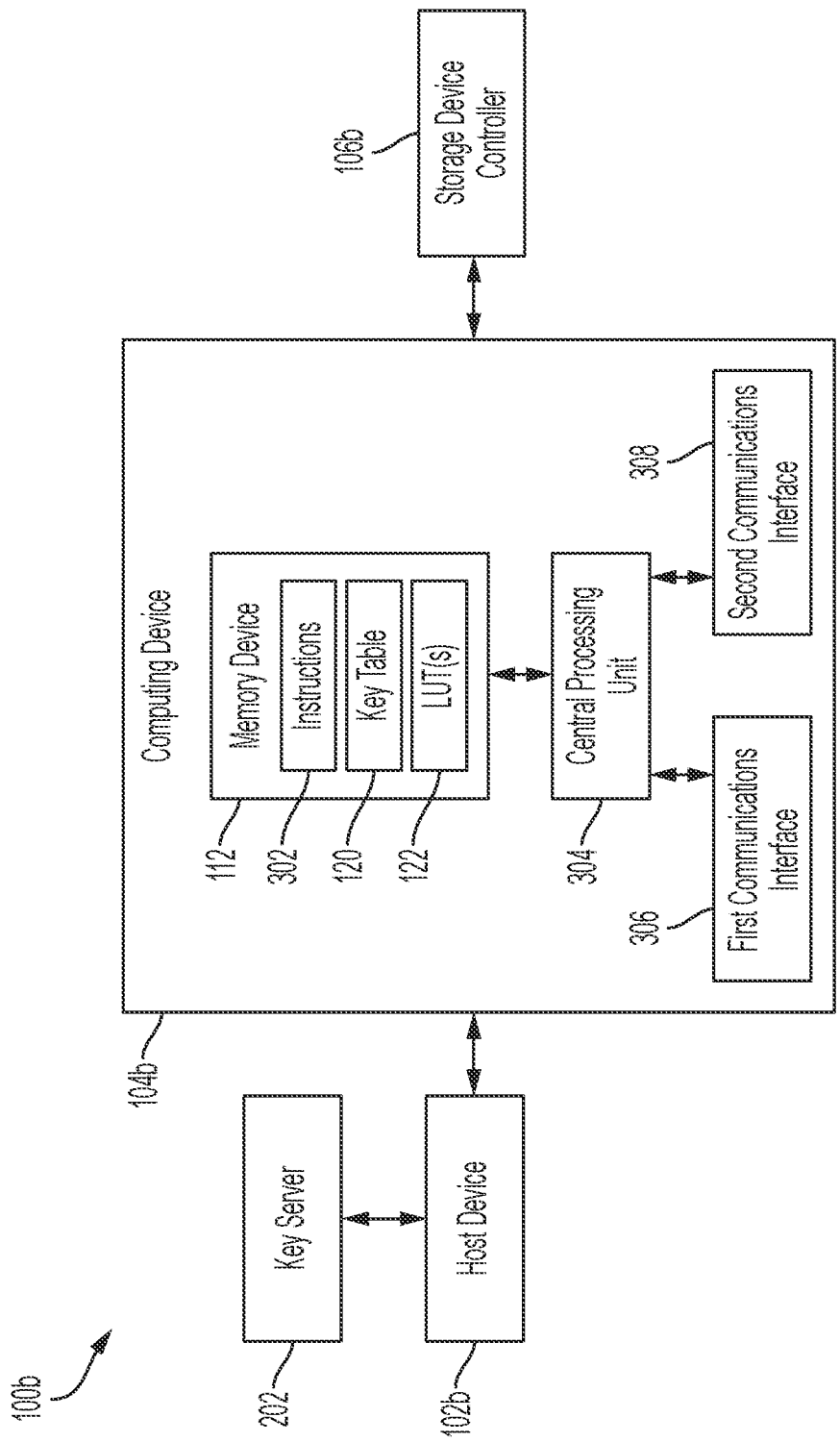
FIG. 3 is a diagram of a system in which a key per I/O device is implemented as a computing device including a central processor unit.

Referring to FIG. 3, a diagram of a system 100*b* in which the key per I/O device 104 of the system 100 corresponds to a computing device 104*b* is shown. In the illustrated example, the computing device 104*b* includes a central processing unit 304 corresponding to the processing device 108. The central processing unit 304 is configured to execute instructions 302 stored in the memory device 112 to provide key per I/O as described herein. The memory device 112 stores the key table 120 and the LUTs 122 in addition to the instructions 302. In some implementations, elements stored in the memory device 112 may be stored on different physical devices. The computing device 104*b* further includes a first communications interface 306 and a second communications interface 308 corresponding to the communications circuitry 110. The first communications interface 306 is in communication with a host device 102*b* corresponding to the host device 102 and the second communication interface 308 is in communication with a storage device controller 106*b* corresponding to the storage device controller 106. The first communications interface 306 may include a PCIe interface, an I2C interface, a SMBus interface, a network interface controller, another types of interface, or a combination thereof. The host device 102*b* is in communication with the key server 202. The second communications interface 308 may include a PCIe interface, an I2C interface, a SMBus interface, a network interface controller, another types of interface, or a combination thereof.

It should be noted that while FIGS. 2 and 3 illustrate examples in which the key per I/O device 104 is a FPGA and a computing device, the key per I/O device 104 corresponds to other types of devices in other implementations. For example, the key per I/O device 104 may correspond to a system on chip (SoC) device, or a general purpose CPU device.

Figure 4:
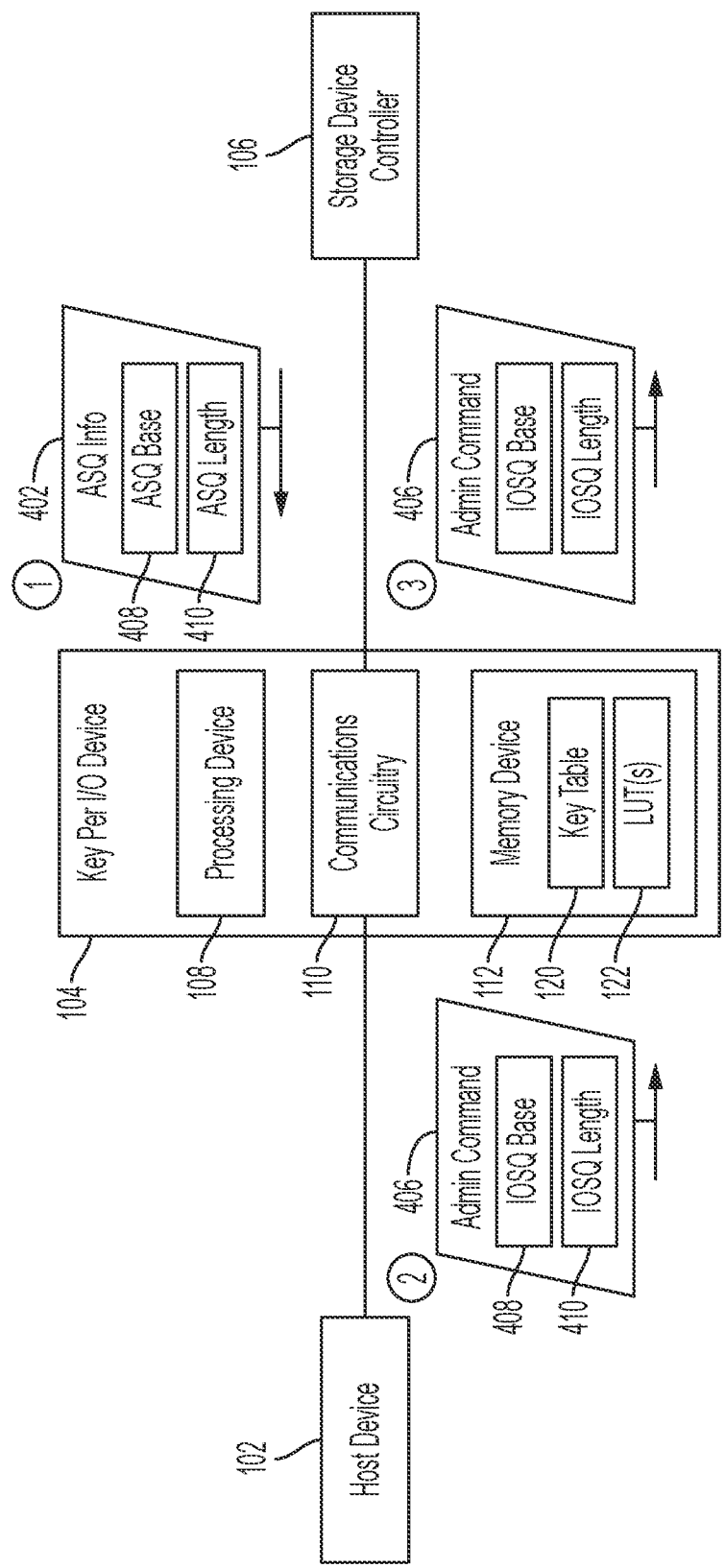
FIG. 4 is a diagram illustrating data flow during configuration of snoop filters used by a key per I/O device.

Referring to FIG. 4, a diagram is shown illustrating data flow during configuration of snoop filters (e.g., filters that identify what commands the key per I/O device 104 is to perform additional processing on rather than simply passing through to a next device) used by the key per I/O device 104. As shown, the key per I/O device 104 receives admin submission queue (ASQ) information 402 from the storage device controller 106 through the communications circuitry 110. The ASQ information 402 may be sent to the key per I/O device 104 in response to a request from the key per I/O device 104. In some implementations, the key per I/O device 104 reads the ASQ information 402 from NVMe registers in the storage device controller 106. The ASQ information 402 identifies a location of an ASQ in memory of the host device 102. In the illustrated example, the ASQ information 402 includes an ASQ base address 408 (indicating an address in the memory of the host device 102) and an ASQ length 410. Using the ASQ information 402, the processing device 108 sets a filter to identify admin commands fetched by the storage device controller 106.

In an illustrative example, the FPGA 104*a* of FIG. 2 may receive the ASQ information 402 from the SSD controller 106*a* through the second PCIe interface 228 or through the I2C interface. The FPGA 104*a* may update the firmware 214 based on the ASQ information 402 to cause the controller 218 to identify admin commands from the host device 102*a* based on the memory location indicated by the ASQ information 402.

As another example, the computing device 104*b* of FIG. 3 may receive the ASQ information 402 from the storage device controller 106*b* through the second communications interface 308. The central processing unit 304 may update the instructions 302 based on the ASQ information 402 to cause the central processing unit 304 to identify admin commands from the host device 102b based on the memory location indicated by the ASQ information 402. In some implementations, the ASQ information 402 may be captured by the computing device 104b as the host device 102 performs NVMe configuration of the storage device controller 106.

Referring back to FIG. 3, the key per I/O device 104 receives an admin command 406 from the host device 102 at the communications circuitry 110. In some examples, the admin command 406 may be a response to a fetch request from the storage device controller 106 forwarded to the host device 102 by the key per I/O device 104. The key per I/O device 104 is configured to identify the admin command 406 as an admin command based on a memory address of the admin command 406 (e.g., based on the filter set according to the ASQ information 402). The admin command 406 identifies a location of an I/O submission queue (IOSQ) in a memory of the host device 102. In the illustrated example, the admin command 406 includes an IOSQ base address 408 and an IOSQ length 410. The processing device 108 sets an I/O command filter to identify I/O commands based on the IOSQ memory location. The key per I/O device 104 further forwards the admin command 406 to the storage device controller 106 through the communications circuitry.

In an illustrative example, the FPGA 104a of FIG. 2 may receive the admin command 406 from the host device 102a through the first PCIe interface 226. The FPGA 104a may update the firmware 214 based on the admin command 406 to cause the controller 218 to identify I/O commands from the host device 102a based on the memory location indicated by the admin command 406. The FPGA 104a may further forward the admin command 406 to the SSD controller 106a.

As another example, the computing device 104b of FIG. 3 may receive the admin command 406 from the host device 102b through the first communications interface 306. The central processing unit 304 may update the instructions 302 based on the admin command 406 to cause the central processing unit 304 to identify I/O commands from the host device 102b based on the memory location indicated by the admin command 406. The FPGA 104a may further forward the admin command 406 to the storage device controller 106b.

Thus, FIG. 4 illustrates how a key per I/O device may configure a filter to monitor for I/O commands. The key per I/O device may then apply key per I/O security to these I/O commands as described further below. It should be noted that while the key per I/O device 104 may set more than one admin command filter and/or more than one IOSQ filter.

Figure 5:
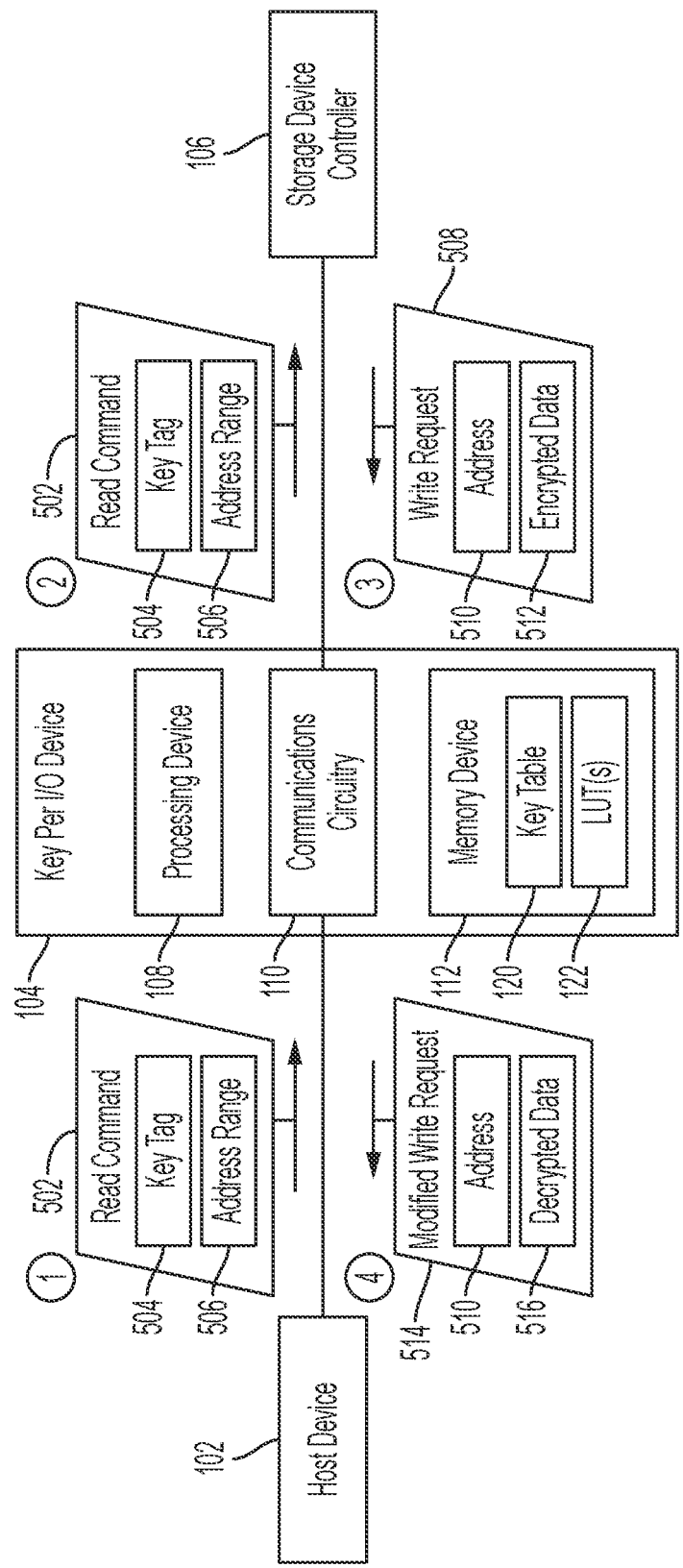
FIG. 5 is a diagram illustrating provision of key per I/O security to a read command.

Referring to FIG. 5, a diagram illustrating provision of key per I/O security to a read command is shown. In FIG. 5, the key per I/O device 104 receives a read command 502 from the host device 102 through the communications circuitry 110. The processing device 108 determines to perform additional processing on the read command 502 in response to determining that a source address at the host device 102 corresponds to a IOSQ filter set up as described above with reference to FIG. 4. The read command 502 includes a key tag 504 and an address range 506 (e.g., a physical region page, a scatter gather list, etc.). The address range 506 corresponds to a memory address range at the host device 102. The processing device 108 updates a decryption LUT included in the one or more LUTs 122 to associate the key tag 504 with the address range 506 and forwards the read command 502 to the storage device controller 106 through the communications circuitry 110. In some implementations, the processing device 108 removes the key tag 504 from the read command 502 prior to forwarding the read command 502 to the storage device controller 106.

Subsequently, the key per I/O device 104 receives a write request 508 from the storage device controller 106 through the communications circuitry 110. The write request 508 includes encrypted data 512 retrieved from a storage device as a result of the read command 502. The write request 508 further includes an address 510 identifying a memory address within the host device 102 at which to write data. The processing device 108 identifies the key tag 504 in the LUTs 122 based on the address 510, identifies a key corresponding to the key tag 504 in the key table 120, and uses the key to decrypt the encrypted data 512 resulting in decrypted data 516. The processing device 108 further initiates transfer of a modified write request 514 to the host device 102 through the communications circuitry 110. The modified write request 514 indicates that the decrypted data 516 is to be written to the address 510.

By storing associations between address ranges and key tags, the key per I/O device 104 may apply a different key to each individual read command. For example, a first read command from the host device 102 may include a first address range and a first key tag while a second read command from the host device 102 includes a second address range and a second key tag. The key per I/O device 104 may associate the first key tag with the first address range and associate the second key tag with the second address range. Then, when the key per I/O device 104 receives a request to write data from the storage device controller 106 to an address of the host device 102 in the first address range, the key per I/O device 104 may identify the first key tag based on the association with the first address range. The key per I/O device 104 may then identify a first key based on the first key tag and use the key to decrypt the data before writing to the address in the first address range. Similarly, when the key per I/O device 104 receives a request to write data from the storage device controller 106 to an address of the host device 102 in the second address range, the key per I/O device 104 may identify the second key tag based on the association with the second address range. The key per I/O device 104 may then identify a second key based on the second key tag and use the second key to decrypt the data before writing to the address in the second address range. Thus, the key per I/O device 104 is configured to apply key per I/O security to read commands.

In an illustrative example, the FPGA 104a of FIG. 2 receives the read command 502 from the host device 102a through the first PCIe interface 226. The read response buffer 216 receives the read command 502 from the first PCIe interface 226 and forwards the read command 502 to the controller 218 executing the firmware 214 for processing. The controller 218 determines that the read command 502 is an IO command based on the read command 502 originating from an address corresponding to an IOSQ monitored by the controller (e.g., based on an IOSQ filter programmed into the firmware 214). The controller 218 updates the LUTs 122 to include an association between the key tag 504 and the address range 506 and forwards the read command 502 to the SSD controller 106a through the second PCIe interface 228.

Subsequently, the FPGA 104a receives the write request 508 from the SSD controller 106a through the second PCIe interface 228. The read request buffer 220 receives the write request 508 from the second PCIe interface 228 and forwards the write request 508 to the controller 218 for processing. The controller 218 identifies the key tag 504 in the LUTs 122 based on the address 510 and then identifies a key in the key table 120 based on the key tag 504. The controller 218 forwards the key to the decoder 224 and the decoder 224 decrypts the encrypted data 512 based on the key to generate the decrypted data 516. The controller 218 then initiates transmission of the modified write request 514, including the decrypted data 516, to the host device 102*a* through the first PCIe interface 226.

In another illustrative example, the computing device 104*b* of FIG. 3 receives the read command 502 from the host device 102*b* through the first communications interface 306. The CPU 304 executing the instructions 302 determines that the read command 502 is an IO command based on the read command 502 originating from an address corresponding to an IOSQ monitored by the CPU 304 (e.g., based on an IOSQ filter programmed into the instructions 302). The CPU 304 updates the LUTs 122 to include an association between the key tag 504 and the address range 506 and forwards the read command 502 to the storage device controller 106*b* through the second communications interface 308.

Subsequently, the computing device 104*b* receives the write request 508 from the storage device controller 106*b* through the second communications interface 308. The CPU 304 identifies the key tag 504 in the LUTs 122 based on the address 510 and then identifies a key in the key table 120 based on the key tag 504. The CPU 304 decrypts the encrypted data 512 based on the key to generate the decrypted data 516. The CPU 304 then initiates transmission of the modified write request 514, including the decrypted data 516, to the host device 102*b* through the first communications interface 306.

Figure 6:
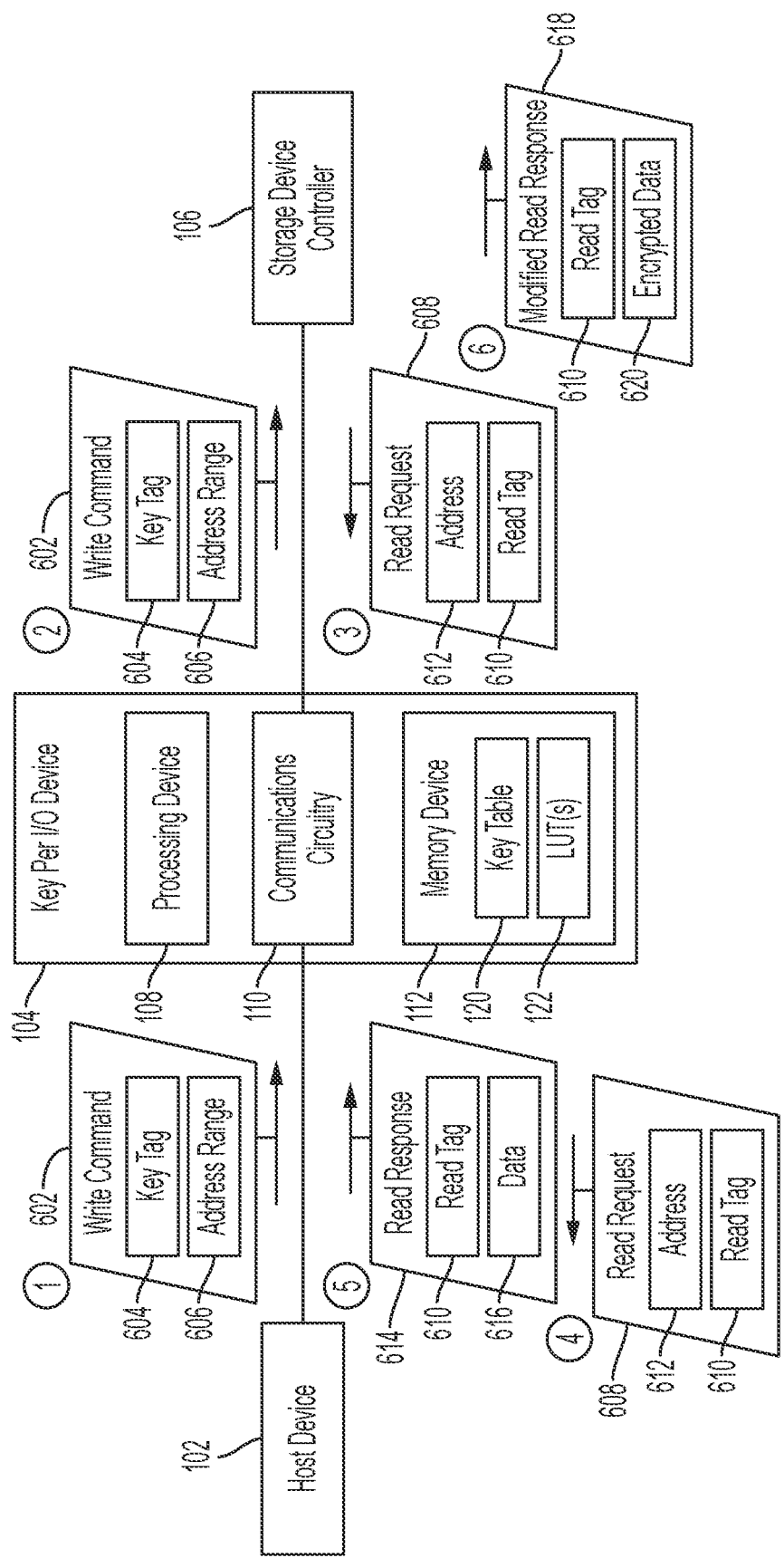
FIG. 6 is a diagram illustrating provision of key per I/O security to a write command.

Referring to FIG. 6, a diagram illustrating provision of key per I/O security to a write command is shown. In FIG. 6, the key per I/O device 104 receives a write command 602 from the host device 102 through the communications circuitry 110. The processing device 108 determines to perform additional processing on the write command 602 in response to determining that a source address at the host device 102 corresponds to a IOSQ filter set up as described above with reference to FIG. 4. The write command 602 includes a key tag 604 and an address range 606 (e.g., a physical region page, a scatter gather list, etc.). The address range 606 corresponds to a memory address range at the host device 102. The processing device 108 updates an encryption LUT included in the one or more LUTs 122 to associate the key tag 604 with the address range 606 and forwards the write command 602 to the storage device controller 106 through the communications circuitry 110. In some implementations, the processing device 108 removes the key tag 604 from the write command 602 prior to forwarding the write command 602 to the storage device controller 106.

Subsequently, the key per I/O device 104 receives a read request 608 from the storage device controller 106 through the communications circuitry 110. The read request 608 includes an address 612 and a read tag 610. The address 612 identifies a memory address within the host device 102 from which to read data to be written to a storage device controlled by the storage device controller 106. The read tag 610 identifies the read request 608. In some examples, the read tag 610 corresponds to a PCIe memory read request tag. The processing device 108 identifies the key tag 604 in the LUTs 122 based on the address 612 and updates a read tag to key tag LUT in the LUTs 122 to store an association between the read tag 610 and the key tag 604. The processing device 108 further forwards the read request 608 to the host device 102 through the communications circuitry 110. The read response 614 includes the read tag 610 and data 616 to be written to storage device managed by the storage device controller 106. The processing device 108 identifies the key tag 604 in the LUTs 122 based on the read tag 610, identifies a key in the key table 120, based on the key tag 604, and generates encrypted data 620 by encrypting the data 616 using the key. The processing device 108 initiates transmission of a modified read response 618 including the encrypted data 620 to the storage device controller 106 through the communications circuitry 110. The encrypted data 620 can then be stored in a storage device by the storage device controller 106.

By storing associations between address ranges and key tags and between read tags and key tags, the key per I/O device 104 may apply a different key to each individual write command. For example, a first write command from the host device 102 may include a first address range and a first key tag while a second write command from the host device 102 includes a second address range and a second key tag. The key per I/O device 104 may store a first association between the first address range and the first key tag and store a second association between the second address range and the second key tag in the LUTs 122. Subsequently, the key per I/O device 104 may receive a first read request and a second read request from the storage device controller 106. The first read request may identify a first address in the first address range and a first read tag while the second read request identifies a second address in the second address range and a second read tag. The key per I/O device 104 may lookup the first key tag based on the first address and then store an association between the first key tag and the first read tag in the LUTs 122. Similarly, the key per I/O device 104 may lookup the second key tag based on the second address and then store an association between the second key tag and the second read tag in the LUTs 122. In response to receiving a first read response identifying the first read tag from the host device 102, the key per I/O device 104 may lookup the first key tag based on the first read tag, lookup a first key based on the first key tag, and encrypt data in the first read response based on the first key. Similarly, in response to receiving a second read response identifying the second read tag from the host device 102, the key per I/O device 104 may lookup the second key tag based on the second read tag, lookup a second key based on the second key tag, and encrypt data in the second read response based on the second key.

In an illustrative example, the FPGA 104*a* of FIG. 2 receives the write command 602 from the host device 102*a* through the first PCIe interface 226. The read response buffer 216 receives the write command 602 from the first PCIe interface 226 and forwards the write command 602 to the controller 218 executing the firmware 214 for processing. The controller 218 determines that the write command 602 is an IO command based on the write command 602 originating from an address corresponding to an IOSQ monitored by the controller (e.g., based on an IOSQ filter programmed into the firmware 214). The controller 218 updates the LUTs 122 to include an association between the key tag 604 and the address range 606 and forwards the write command 602 to the SSD controller 106*a* through the second PCIe interface 228.

Subsequently, the FPGA 104*a* receives the read request 608 from the SSD controller 106*a* through the second PCIe interface 228. The read request buffer 220 receives the read request 608 from the second PCIe interface 228 and forwards the read request 608 to the controller 218 executing the firmware 214 for processing. The controller 218 identifies the key tag 604 in the LUTs 122 based on the address 612 and stores an association between the key tag 604 and the read tag 610 in the LUTs 122. The controller 218 forwards the read request 608 to the host device 102a.

Subsequently, the FPGA 104a receives the read response 614 from the host device 102a through the first PCIe interface 226. The read response buffer 216 receives the read response 614 from the first PCIe interface 226 and forwards the read tag 610 from the read response 614 to the controller 218 executing the firmware 214 for processing. The controller 218 identifies the key tag 604 in the LUTs 122 based on the read tag 610, identifies a key in the key table 120 based on the key tag 604, and sends the key to the encoder 222. The encoder 222 encrypts the data 616 to generate the encrypted data 620 using the key. The controller 218 then initiates transmission of the modified read response 618, including the encrypted data 620, to the SSD controller 106a through the second PCIe interface 228.

In another illustrative example, the computing device 104b of FIG. 3 receives the write command 602 from the host device 102b through the first communications interface 306. The CPU 304 executing the instructions 302 determines that the write command 602 is an IO command based on the read command 502 originating from an address corresponding to an IOSQ monitored by the CPU 304 (e.g., based on an IOSQ filter programmed into the instructions 302). The CPU 304 updates the LUTs 122 to include an association between the key tag 604 and the address range 606 and forwards the write command 602 to the storage device controller 106b through the second communications interface 308.

Subsequently, the computing device 104b receives the read request 608 from the storage device controller 106b through the second communications interface 308. The CPU 304 identifies the key tag 604 in the LUTs 122 based on the address 612 and then updates the LUTs 122 to include an association between the key tag 604 and the read tag 610 included in the read request 608. The CPU 304 initiates transmission of the read request 608 to the host device 102b through the first communications interface 306.

Subsequently, the computing device 104b receives the read response 614 from the host device 102b through the first communications interface 306. The CPU 304 identifies the key tag 604 in the LUTs 122 based on the read tag 610 included in the read response 614, identifies a key in the key table 120 based on the key tag 604, and uses the key to encrypt the data 616 in the read response 614. The CPU 304 initiates transmission of the modified read response 618 including the encrypted data 620 to the storage device controller 106b through the second communications interface 308.

Figure 7:
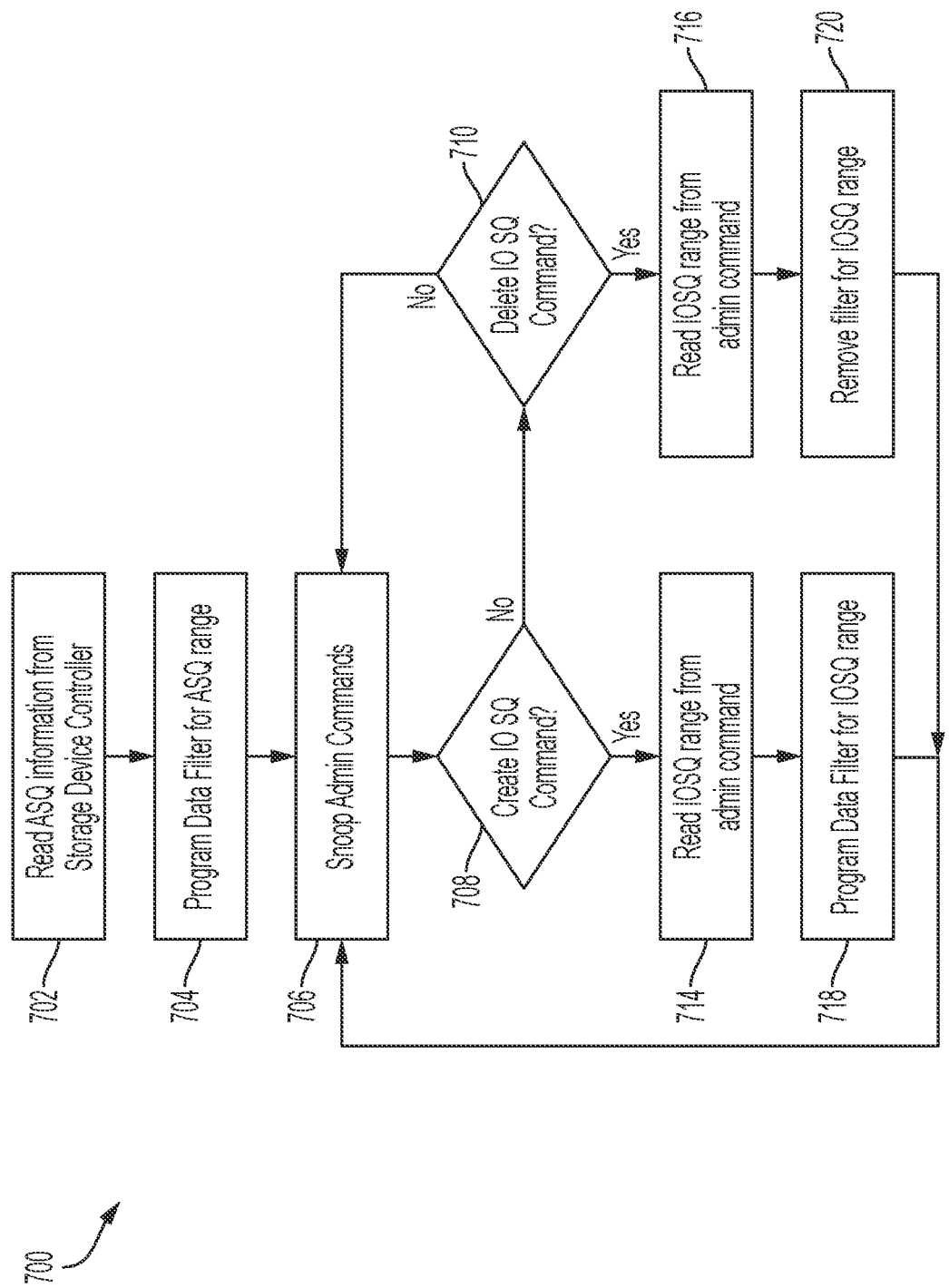
FIG. 7 is a flowchart illustrating a method of setting a data filter to monitor I/O commands.

Referring to FIG. 7, a flowchart illustrating a method 700 of setting a data filter to monitor I/O commands is shown. The method 700 may be performed by the key per I/O device 104 (e.g., the FPGA 104a, the computing device 104b, an SOC device, or other device).

The method 700 includes reading ASQ information from a storage device controller, at 702. The ASQ information may identify an address range (e.g., by base address and length) within a host device. For example, the processing device 108 of the key per I/O device 104 may receive the ASQ information 402 from the storage device controller 106 through the communications circuitry 110 (e.g., by reading one or more status registers within the storage device controller 106).

The method 700 further includes programming a data filter for the ASQ address range, at 704. For example, the processing device 108 may program a data filter to identify admin commands that are received from the host device 102 and that originate from the ASQ address range. In the example of FIG. 2, programming the data filter may include updating the firmware 214. In the example of FIG. 3, programming the data filter may include updating the instructions 302.

The method 700 further includes snooping admin commands, at 706. For example, the processing device 108 may monitor all messages passed between the host device 102 and the storage device controller 106 through the key per I/O device 104 to determine whether any messages originate from the address range identified by the ASQ filter.

The method 700 further includes determining whether an admin command corresponds to a create IOSQ command, at 708. For example, the processing device 108 may determine whether a detected admin command received from the host device 102 is a create IOSQ command based on parameters included in the admin command.

In response to determining that the admin command corresponds to a create IOSQ command, at 708, the method 700 includes extracting an IOSQ address range from the admin command, at 714. For example, the processing device 108 may extract the IOSQ base address 408 and the IOSQ length 410 from the admin command 406.

The method 700 further includes programming a data filter for the IOSQ range, at 718. For example, the processing device 108 may program a data filter to determine that messages received from the host device 102 that originate from the IOSQ range are I/O commands. In the example of FIG. 2, programming the data filter may include updating the firmware 214. In the example of FIG. 3, programming the data filter may include updating the instructions 302.

The method 700 further includes continuing to snoop admin commands, at 706.

In response to determining that the admin command does not correspond to a create IOSQ command, at 708, the method 700 includes determining whether the admin command corresponds to a delete IOSQ command, at 710. For example, the processing device 108 may determine whether a detected admin command received from the host device 102 is a delete IOSQ command based on parameters included in the admin command.

In response to determining that the admin command corresponds to delete IOSQ command, at 710, the method 700 includes extracting an IOSQ range from the admin command, at 716. For example, the processing device 108 may extract a base address and length from a delete IOSQ command.

The method 700 further includes removing a data filter for the IOSQ range, at 720. For example, the processing device 108 may program delete a data filter set to determine that messages received from the host device 102 that originate from the IOSQ range are I/O commands. In the example of FIG. 2, deleting the data filter may include updating the firmware 214. In the example of FIG. 3, deleting the data filter may include updating the instructions 302.

The method 700 further includes continuing to snoop admin commands, at 706.

Further, in response to determining that the admin command does not correspond to a delete IOSQ command, at 710, the method 700 includes continuing to snoop admin commands, at 706.

Thus, FIG. 7 illustrates a method by which a key per I/O device may establish a filter to monitor for I/O commands flowing between a host device and a storage device controller. As described further below, the key per I/O device may implement key per I/O security for I/O commands detected by the filter.

Figure 8:
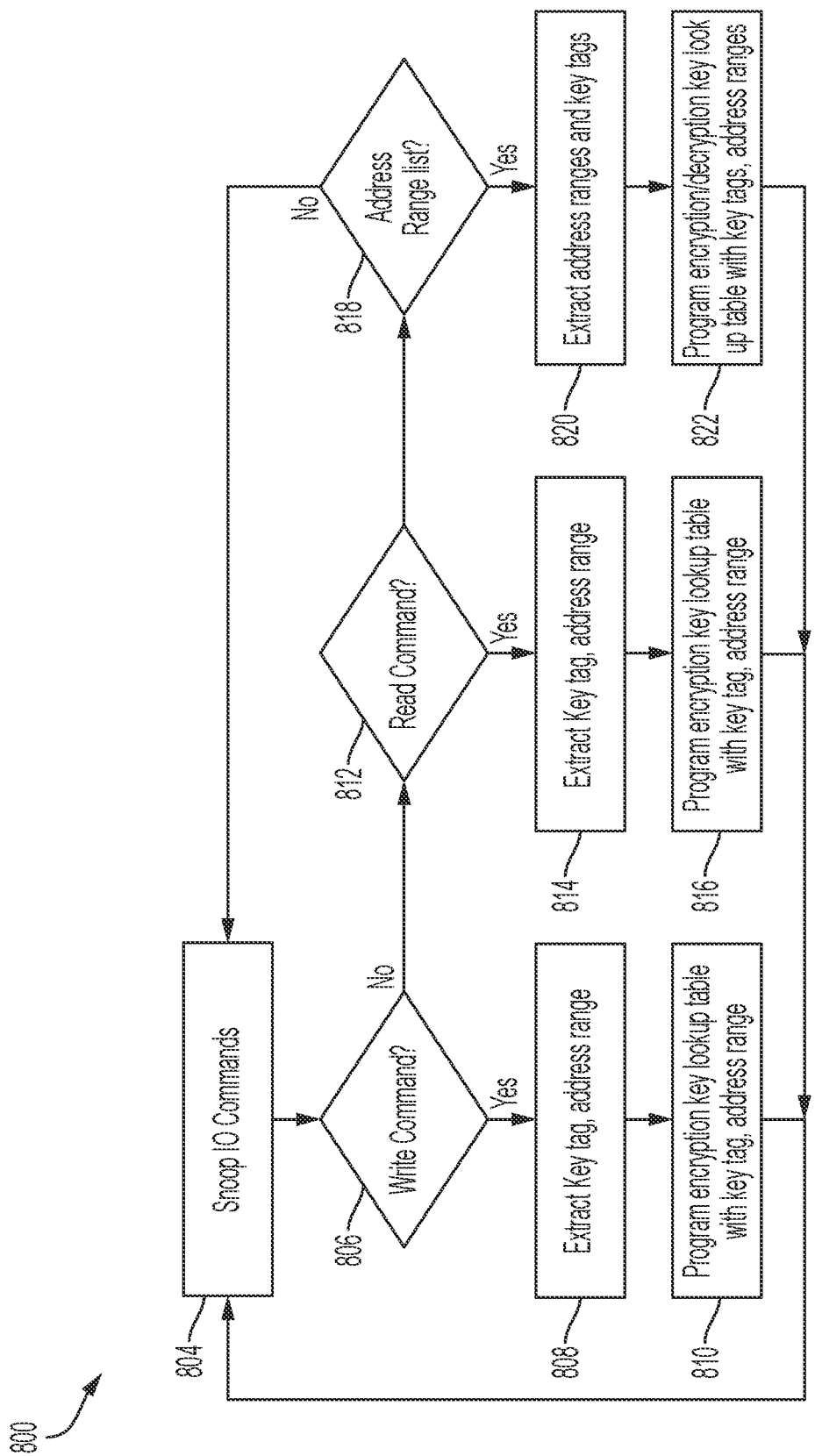
FIG. 8 is flowchart illustrating a method for building look up tables (LUTs) for use in providing key per I/O security.

Referring to FIG. 8, a flowchart illustrating a method 800 for building look up tables for use in providing key per I/O security is shown. The method 800 may be performed by the key per I/O device 104 (e.g., the FPGA 104a, the computing device 104b, an SOC device, or other device).

The method 800 includes snooping I/O commands, at 804. For example, the processing device 108 may monitor traffic between the host device 102 and the storage device controller 106 that passes through the key per I/O device 104 to identify I/O commands using an IOSQ filter set according to the method 700 described above. Snooping for I/O commands may include detecting data originating from the IOSQ identified by the IOSQ filter. This data may include I/O commands or other data (e.g., address range lists).

The method 800 further includes determining whether detected data from the IOSQ is a write command, at 806. For example, the processing device 108 may determine whether a detected I/O command received from the host device 102 is a write command based on parameters included in the I/O command.

In response to determining, at 806, that the detected data from the IOSQ is a write command, the method 800 further includes extracting a key tag and address range (e.g., PRP, SGL, etc.) from the I/O command, at 808. For example, in response to determining that the write command 602 is a write command, the processing device 108 may extract the key tag 604 and the address range 606 from the write command 602.

The method 800 further includes programming an encryption key lookup table with the key tag and address range, at 810. For example, the processing device 108 may generate a LUT row associating the key tag 604 with the address range 606 and insert the row into an encryption key LUT included in the LUTs 122.

The method 800 further includes continuing to snoop for I/O commands, at 806.

In response to determining, at 806, that the detected data from the IOSQ is not a write command, the method 800 further includes determining whether the I/O command is a read command, at 812. For example, the processing device 108 may determine whether the detected I/O command received from the host device 102 is a read command based on parameters included in the I/O command.

In response to determining, at 812, that the detected data from the IOSQ is a read command, the method 800 further includes extracting a key tag and address range (e.g., PRP, SGL, etc.) from the I/O command, at 814. For example, in response to determining that the read command 502 is a read command, the processing device 108 may extract the key tag 504 and the address range 506 from the read command 502.

The method 800 further includes programming a decryption key lookup table with the key tag and address range, at 816. For example, the processing device 108 may generate a LUT row associating the key tag 504 with the address range 506 and insert the row into a decryption key LUT included in the LUTs 122.

The method 800 further includes continuing to snoop for I/O commands, at 806.

In response to determining, at 812, that the detected data from the IOSQ is not a read command, at 812, the method 800 includes determining whether the detected data from the IOSQ is an address range list (e.g., instead of an I/O command), at 818. For example, the processing device 108 may determine whether the data from the IOSQ is an address list (e.g., a PRP list) based on PRP list read request context information (e.g., previously saved context information).

The method 800 further includes extracting address ranges and key tags, at 820. For example, the processing device 108 may extract a received PRP list from the detected data from the IOSQ and stored context information. Each PRP in the PRP list may further be associated with a key tag stored in a context corresponding to the PRP. The processing device 108 may further extract these key tags.

The method 800 further includes programming an encryption/decryption key lookup table with the key tags and address ranges, at 822. For example, the processing device 108 may generate a LUT for each key tag/address range pair associating that key tag with that address range and insert each row into an encryption/decryption LUT included in the LUTs 122.

The method 800 further includes continuing to snoop for I/O commands, at 806.

Thus, the method 800 may be used to configure LUTs for use in key per I/O command security as described further below. It should be noted that while encryption, decryption, and encryption/decryption LUTs are described, in some implementations, a single LUT is created by the method 800.

Figure 9B:
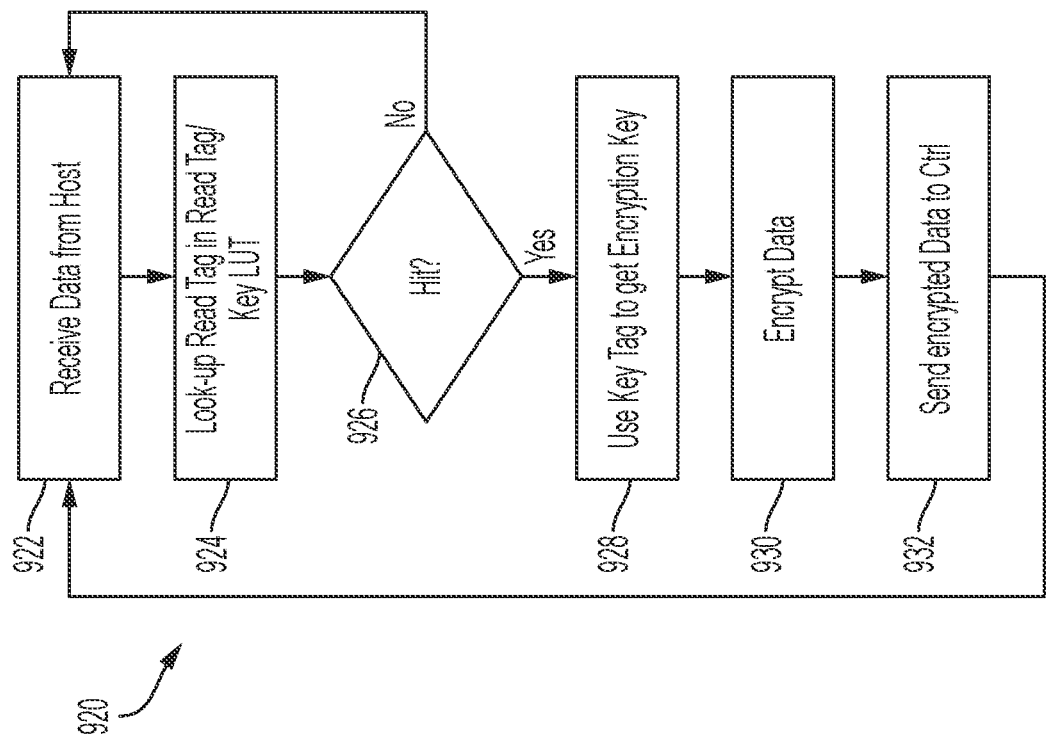
FIG. 9B is a flowchart of a method of encrypting data sent to a storage device controller.
Figure 9A:
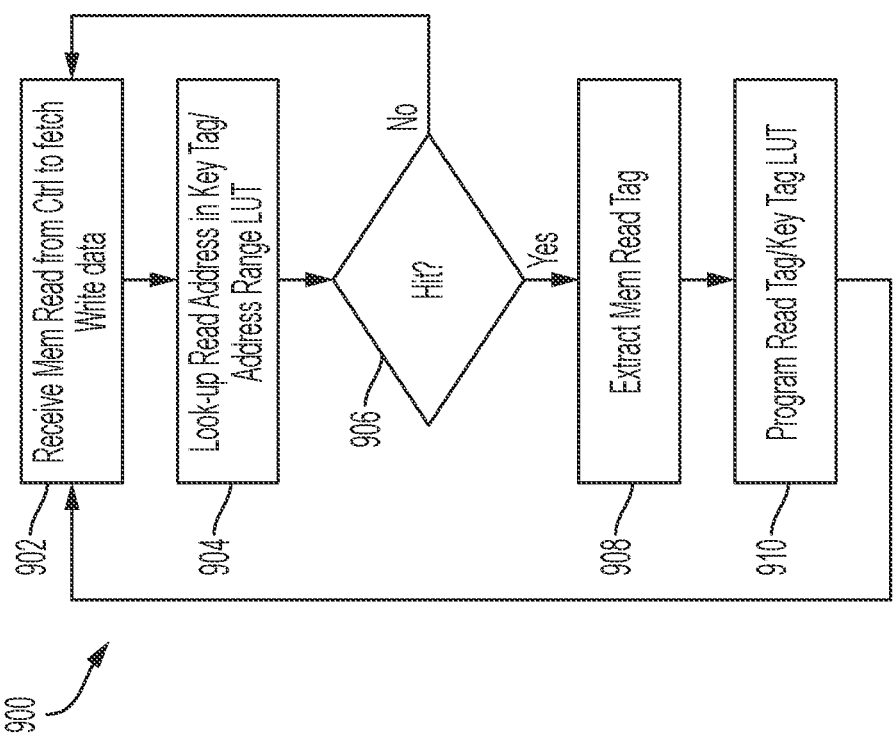
FIG. 9A is a flowchart illustrating a method of preparing a read tag/key tag LUT.

Referring to FIG. 9A a flowchart illustrating a method 900 of preparing a read tag/key tag LUT is shown. The method 900 may be performed by the key per I/O device 104 (e.g., the FPGA 104a, the computing device 104b, an SOC device, or other device).

The method 900 includes receiving a memory read request from a storage device controller to fetch write data (e.g., NVMe write command data), at 902. For example, the processing device 108 may receive the read request 608 from the storage device controller 106 through the communications circuitry 110.

The method 900 further includes looking up the read address in a key tag/address range LUT, at 904. For example, the processing device 108 may look up the address 612 in the LUTs 122.

The method 900 further includes determining whether there is a hit in the LUT, at 906. In response to determining that there is a hit, at 906, the method 900 includes extracting a memory read tag, at 908. For example, in response to identifying the key tag 604 in the LUTs 122 based on the address 612, the processing device 108 may extract the read tag 610 from the read request 608.

The method 900 further includes programming a read tag/key tag LUT, at 910. For example, the processing device 108 may generate a LUT row associating the key tag 604 with the read tag 610 and store the LUT row in the LUTs 122.

The method 900 further includes continuing to monitor for memory read requests, at 902.

In response to determining that there is not hit for the address in the LUT, at 906, the method 900 includes continuing to monitor for memory read requests, at 902.

The read tag/key tag LUT established by the method 900 may be used to identify a key to use to encrypt data sent to a storage device controller. FIG. 9B illustrates a flowchart of a method 920 of encrypting data sent to a storage device controller.

The method 920 includes receiving data from a host, at 922. For example, the processing device 108 may receive the read response 614 from the host device 102 through the communications circuitry 110. The read response 614 includes the data 616 to be sent to the storage device controller 106 to be written to a storage device.

The method 920 further includes looking up a read tag in the read tag/key LUT, at 924. For example, the processing device 108 may lookup the read tag 610 in the LUTs 122. The method 920 further includes determining whether there is a hit in the LUT, at 926. For example, the processing device 108 may determine whether an entry for the read tag 610 is present in the LUTs 122.

In response to determining that there is a hit in the LUT, at 926, the method 920 further includes using the key tag to get an encryption key, at 928. For example, in response to determining that the read tag 610 is associated with the key tag 604 in the LUTs 122, the processing device 108 may look the key tag 604 up in the key table 120 to identify an encryption key associated with the key tag 604.

The method 920 further includes encrypting the data from the host, at 930. For example, the processing device 108 may use the key retrieved from the key table 120 to encrypt the data 616 and generate the encrypted data 620.

The method 920 further includes sending the encrypted data to the storage device controller, at 932. For example, the processing device 108 may initiate transmission of the modified read response 618, including the encrypted data 620, to the storage device controller 106 through the communications circuitry 110.

The method 920 further includes continuing to monitor for data from the host device, at 922.

In response to determining that there is no hit in the LUT, at 926, the method 920 further includes continuing to monitor for data from the host device, at 922. For example, the processing device 108 may initiate transfer of the read response 614 to the storage device controller without modification and continue monitoring for data to write to the storage device controller 106 in response to determining that there is no entry for the read tag 610 in the LUTs 122.

Thus, the method 920 may be used to encrypt data to be written to a storage device controller. Because the method 920 relies on a read tag/key tag LUT established based on an address range/key tag LUT and the address range corresponds to an I/O command, the method 920 may provide key per I/O encryption of data sent to a storage device controller for writing.

Figure 10:
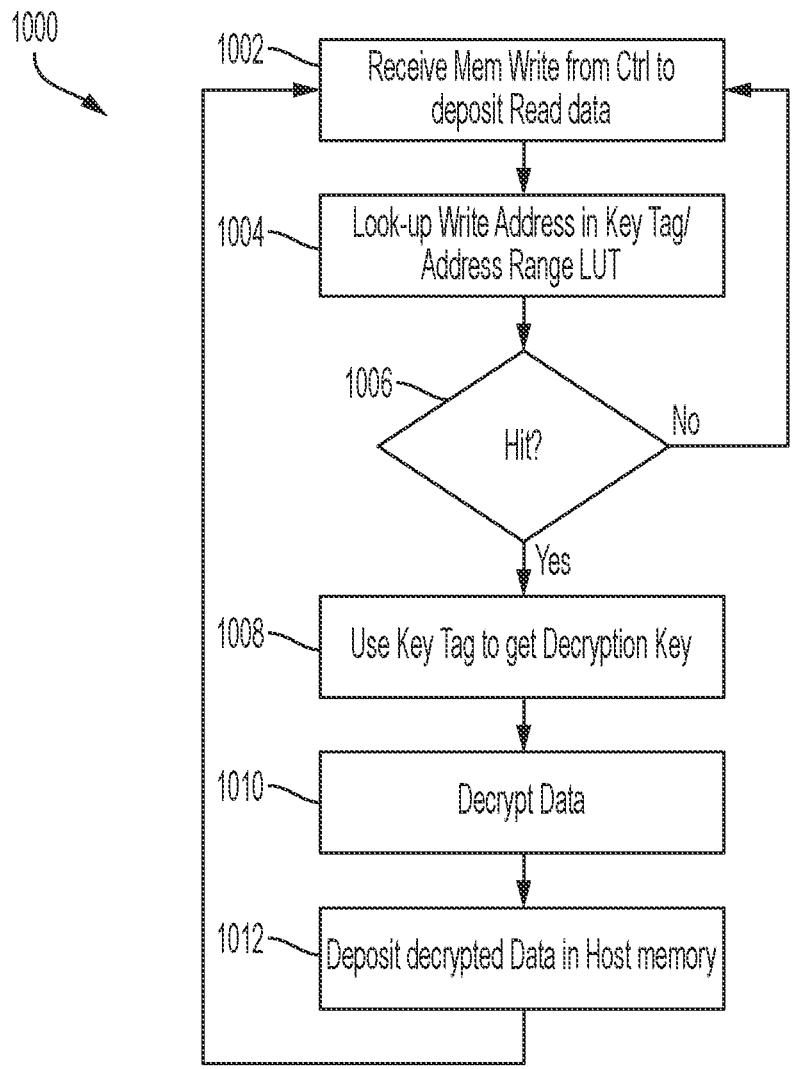
FIG. 10 is a flowchart illustrating a method of decrypting data read from a storage device controller.

Referring to FIG. 10, a flowchart illustrating a method 1000 of decrypting data read from a storage device controller is shown. The method 1000 may be performed by the key per I/O device 104 (e.g., the FPGA 104a, the computing device 104b, an SOC device, or other device).

The method 1000 includes receiving a memory write from a controller to deposit read command (e.g., NVMe read command) data, at 1002. For example, the processing device 108 may receive the write request 508 from the storage device controller 106 through the communications circuitry 110. The write request 508 includes the encrypted data 512 and the address 510 of the host device at which a decrypted version of the encrypted data 512 is to be written.

The method 1000 further includes looking up the write address in a key tag/address range LUT, at 1004. For example, the processing device 108 may lookup the address 510 in the LUTs 122.

The method 1000 further includes determining whether there is a hit in the LUT for the address, at 1006. In response to determining there is a hit, at 1006, the method 1000 includes using the key tag to get a decryption key, at 1008. For example, in response to determining that the key tag 504 is associated with the address 510 in the LUTs 122, the processing device 108 may lookup the key tag 504 in the key table 120 to identify a decryption key.

The method 1000 further includes using the decryption key to decrypt the data, at 1010. For example, the processing device 108 may use the decryption key to decrypt the encrypted data 512 and generate the decrypted data 516.

The method 1000 further includes depositing the decrypted data in host memory, at 1012. For example, the processing device 108 may initiate transmission of the modified write request 514, including the decrypted data 516, to the host device 102 for storage at the address 510.

The method 1000 further includes continuing to monitor for writes from the storage device controller, at 1002.

In response to determining that there is no hit in the LUT for the write address, at 1006, the method 1000 includes continuing to monitor for writes from the storage device controller, at 1002. For example, the processing device 108 may initiate transmission of the write request 508 to the host device 102 through the communications circuitry 110 in response to determining that there is not a hit for the address 510 in the LUTs 122.

Thus, the method 1000 may be used to decrypt data to be written to a host device memory (e.g., in response to a read command from the host device). Because the method 1000 relies on an address range/key tag LUT and the address range corresponds to an I/O command, the method 1000 may provide key per I/O encryption of data written to the host device (e.g., for read commands).

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes or method steps may be performed substantially at the same time or performed in a different order than the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

What is claimed is:

1. A device comprising:
a first processor configured to:
    receive a first request from a computing device, the first request being associated with a first address and including a first value;
    store the first value in association with the first address;
    transmit the first request to a second processor of a storage device;
    receive a second request from the second processor in response to the first request, the second request including a second address and an identifier for tracking the second request;
    identify the first value based on the second address;
    store the identifier in association with the first value; and
    initiate transmission of the second request to the computing device.

2. The device of claim 1, wherein first request is a write request, and second request is a read request.

3. The device of claim 1, wherein the first processor is further configured to receive a response to the second request, wherein the response includes the identifier and data associated with the second address.

4. The device of claim 3, wherein the first processor is further configured to:
    identify the first value based on the identifier;
    encrypt the data based on the first value to generate encrypted data; and
    transmit the encrypted data to the second processor.

5. The device of claim 1, wherein the first processor is further configured to create a filter for monitoring requests to and from the second processor.

6. The device of claim 1, wherein the processor is further configured to:
    receive a third request from the computing device, the third request being associated with a third address and including a second value;
    store the third address in association with the second value; and
    identify a key based on the second value.

7. The device of claim 6, wherein the third request is a read request, and the first processor is further configured to transmit the third request to the second processor.

8. The device of claim 6, wherein the first processor is further configured to:
    receive a fourth request from the second processor in response to the third request, the fourth request being associated with a fourth address and including encrypted data;
    identify the second value based on the fourth address;
    identify a decryption key based on the second value;
    decrypt the encrypted data based on the decryption key and output decrypted data;
    transmit the decrypted data to the computing device.

9. The device of claim 8, wherein the fourth request is a write request.

10. The device of claim 1, further comprising a memory device storing one or more lookup tables, the one or more lookup tables storing the first value in association with the first address, and further storing the identifier in association with the first value.

11. A method comprising:
    receiving a first request, the first request being associated with a first address and including a first value;
    storing the first value in association with the first address;
    transmitting the first request to a processor of a storage device;
    receiving a second request from the processor in response to the first request, the second request including a second address and identifier for tracking the second request;
    identifying the first value based on the second address;
    storing the identifier in association with the first value; and
    initiating transmission of the second request.

12. The method of claim 11, wherein first request is a write request, and second request is a read request.

13. The method of claim 11 further comprising:
    receiving a response to the second request, wherein the response includes the identifier and data associated with the second address.

14. The method of claim 13 further comprising:
    identifying the first value based on the identifier;
    encrypting the data based on the first value to generate encrypted data; and
    transmitting the encrypted data to the processor.

15. The method of claim 11 further comprising:
creating a filter for monitoring requests to and from the second processor.

16. The method of claim 11 further comprising:
receiving a third request, the third request being associated with a third address and including a second value;
storing the third address in association with the second value; and
identifying a key based on the second value.

17. The method of claim 16, wherein the third request is a read request, and the method further comprises:
transmitting the third request to the processor.

18. The method of claim 16 further comprising:
receiving a fourth request from the processor in response to the third request, the fourth request being associated with a fourth address and including encrypted data;
identifying the second value based on the fourth address;
identifying a decryption key based on the second value;
decrypting the encrypted data based on the decryption key and output decrypted data; and
transmitting the decrypted data.

19. The method of claim 18, wherein the fourth request is a write request.

20. The method of claim 11 further comprising:
searching one or more lookup tables storing the first value in association with the first address; and
searching the one or more lookup tables storing the identifier in association with the first value.

\* \* \* \* \*

UNITED STATES PATENT AND TRADEMARK OFFICE
CERTIFICATE OF CORRECTION

PATENT NO. : 11,902,422 B2
APPLICATION NO. : 18/090110
DATED : February 13, 2024
INVENTOR(S) : Ramdas P. Kachare et al.

It is certified that error appears in the above-identified patent and that said Letters Patent is hereby corrected as shown below:

In the Claims

In Column 18, Line 51, in Claim 11, delete "identifier" and insert -- an identifier --.

Signed and Sealed this
Twenty-eighth Day of May, 2024

Katherine Kelly Vidal
*Director of the United States Patent and Trademark Office*